Feb. 26, 1957     E. H. BLATTNER     2,782,731
SNUBBER END CONNECTION
Filed Jan. 8, 1953                             2 Sheets-Sheet 1
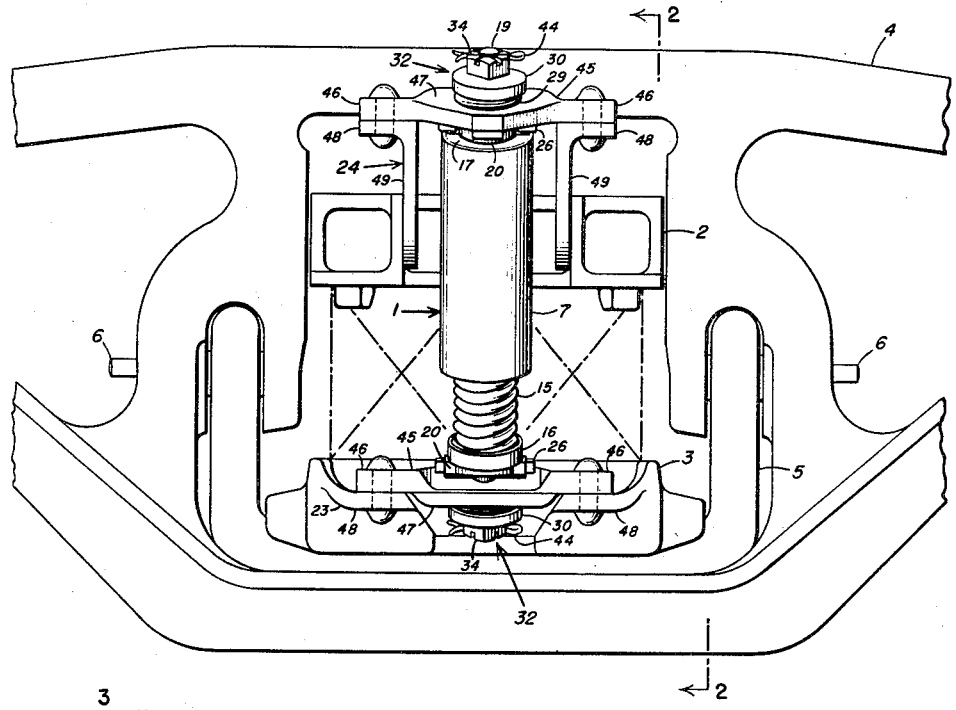
FIG. 1
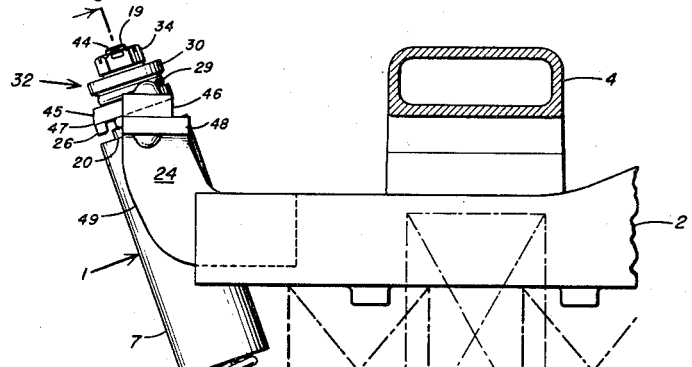
FIG. 2
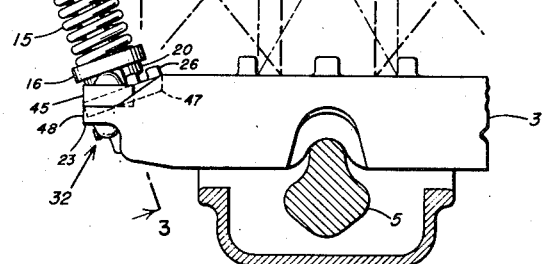
Inventor:
Emil H. Blattner
By Wilmer Mechlin
his Attorney Feb. 26, 1957 E. H. BLATTNER 2,782,731
SNUBBER END CONNECTION
Filed Jan. 8, 1953 2 Sheets-Sheet 2
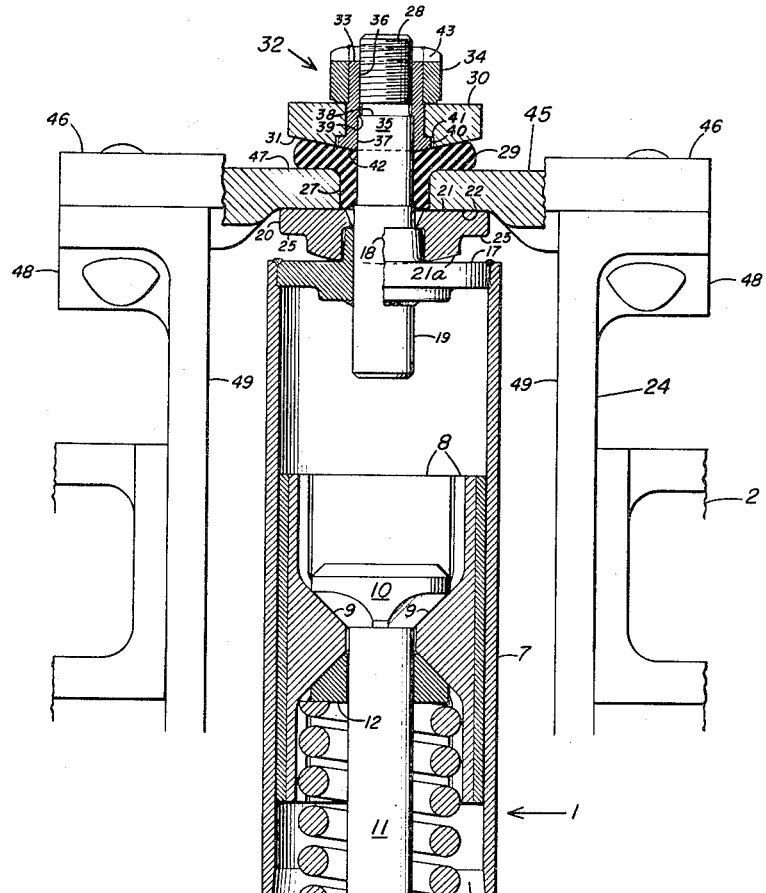
FIG. 3
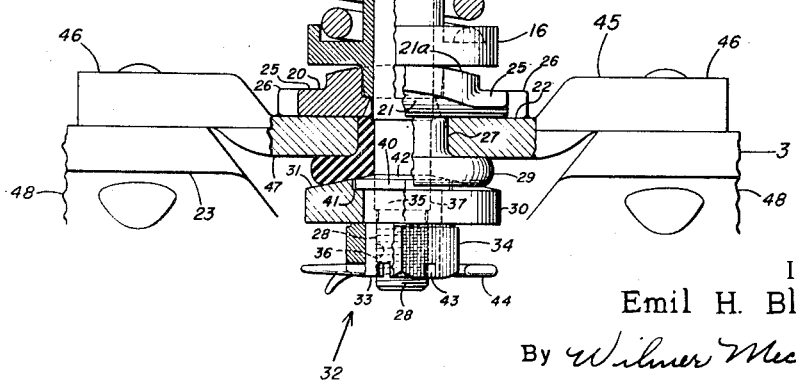
Inventor:
Emil H. Blattner
By Wilmer Mecklin
his Attorney

United States Patent Office 2,782,731
Patented Feb. 26, 1957

2,782,731
SNUBBER END CONNECTION

Emil H. Blattner, Williamsville, N. Y., assignor to The Symington-Gould Corporation, Depew, N. Y., a corporation of Maryland Application January 8, 1953, Serial No. 330,247

11 Claims. (Cl. 105—191)

This invention relates to snubbers for snubbing the relative movement of members which respectively support and are supported by springs, and more particularly to end connections between such snubbers and members.

In snubbing the harmonic vibration or recoil of supporting springs, dampening means or snubbers of three general types are employed, one fitted between the spring supported and supporting members, another built into the supported member, and the third connected to the supported and supporting members.

The end connections of the instant invention are designed for snubbers of the third type in which the connections are made by studs or bolts projecting from the ends of the snubber and threadedly connected to the members. Such threaded connections normally provide for relative movement of the snubber in at least one direction transversely of its axis and usually serve as universal connections, with the result that a bending moment is applied to the nut threaded to the stud and therethrough to the threaded portion of the stud, this repetitive fatigue often finally resulting in failure through the threads.

Another difficulty with snubbers of the type here involved is that they usually must be disassembled, at least in part, for attachment to and removal from the members which they connect, making their attachment and particularly their removal and replacement in the field extremely difficult.

The primary object of the invention is to provide an improved end connection for connecting a snubber of the type described to one or both of the members whose movement it dampens.

Another object of the invention is to provide an improved end connection for snubbers of the threadedly connected type, whereby a snubber can be preassembled and applied to or removed from the members which it connects without partial disassembly and, when applied, inhibits fatigue of the threaded connection.

A further object of the invention is to provide an improved end connection for connecting a snubber to spring supporting and supported members whereby the threaded portion of the connecting bolt or like part of the threaded connection is relieved of bending moments incident to movement of the snubber transversely of the member.

An additional object of the invention is to provide an improved end connection for snubbers which are threadedly connected to two relatively movable members of a railway truck, wherein the end connections are made initially to end plates which, in turn, are bolted or riveted to the members, whereby the snubber with its end plates can be applied or removed as a unit without partial disassembly of the snubber.

A further object of the invention is to provide an improved end connection for snubbers threadedly connected through projecting studs or bolts to two relatively movable members wherein the bending moment to which the threaded portion of the bolt is normally subjected is applied, instead, through a tight fitting sleeve to the thicker unthreaded stem of the bolt, thereby inhibiting failure through fatigue of the connection.

Other objects and advantages of the invention will appear hereinafter in the detailed description, be particularly pointed out in the appended claims, and be illustrated in the accompanying drawings, in which:

Figure 1 is a fragmentary side elevational view of a railway truck showing a preferred embodiment of the snubber end connection of the present invention.

Figure 2 is a vertical sectional view taken along the lines 2—2 of Figure 1; and Figure 3 is an enlarged vertical sectional view of the snubber and its end connections taken along the lines 3—3 of Figure 2.

Referring now in detail to the drawings in which like reference characters designate like parts, the improved snubber end connection of the present invention, for connecting a snubber to either or both of a pair of relatively movable members to snub or dampen the harmonics of the interposed springs, has been illustrated applied to a railway truck, the snubber 1 being connected to relatively movable spring-supporting and supported members of the truck through studs or bolts projecting axially from either end of the snubber. The particular truck shown is of the "Chrysler" type in which a bolster 2 is spring-supported on a spring plank 3, the latter being suspended from and laterally movable relative to the side frames 4 by swing hangers 5 which are connected to the truck by pintles 6. The snubber 1 is connected to the outer ends of the bolster 2 and spring plank 3 and inclined outwardly above the spring plank for maximum travel without interference with other components of the truck.

The snubber 1 is similar to that shown in Janeway et al. Patent No. 2,574,788 and is comprised of a barrel or housing 7, housing a plurality of friction shoes 8. The shoes have integral opposed inner wedging surfaces 9 through which they are urged or wedged outwardly into frictional engagement with the housing by the coaction of the wedge head 10 of a wedge bolt or stud 11 and a wedge ring or collar 12 slidably encircling the stem or shank 13 of the bolt. Below the wedge ring 12, the wedge bolt 11 projects axially through the open lower end 14 of the barrel and is encircled by a coil spring 15 acting between the wedge ring 12 and a spring retainer 16 and applying constant friction to the barrel 7 through the friction shoes 8.

The upper end of the housing 7 is closed by a cover or cap 17 welded to the barrel and having a hub 18 through which projects outwardly of the housing a stud or bolt 19, the stud being welded to the cover.

As in the snubber of the Janeway patent, a double-faced rocker 20 encircles each of the bolts 11 and 19 and bears against or is supported on the outer face of the related spring retainer 16 or cover 17, the rockers having double-beveled outer and inner faces 21 and 21a, respectively, the outer faces bearing against or riding on the confronting or inner faces 22 of mountings or brackets 23 and 24 rigid with the spring plank 3 and bolster 2, respectively and the inner faces 21a having a corresponding relation with the confronting faces of the retainer 16 and cap 17. The double-faced rockers are designed to accommodate the relative motion of the spring plank and bolster both laterally and longitudinally of the railway truck, the bevelling of their outer faces 21, for this purpose, being disposed substantially perpendicular to that of their inner faces 21a. To ensure proper positioning of the rockers on assembly or application, each has a pair of integral positioning arms 25 projecting radially from opposite sides and positioned by positioning lugs 26 on the mountings 23 and 24.

Outwardly of the rockers the wedge bolt 11 and stud 19 project through apertures or openings 27 in the associated mountings 23 and 24 and terminate therebeyond in threaded end portions 28. For resiliently connecting the snubber to the spring plank and bolter, a resilient block or washer 29 of rubber or like material is inserted between the bolts 11 and 19 and their mountings 23 and 24, the rubber blocks normally being compressed by end caps or collars 30, having convexly curved underfaces 31 in contact with the rubber blocks to facilitate movement of the snubber transversely of the mountings.

In threaded connections such as those of the Janeway patent the end cap or like member below the nut has a running fit with the bolt. Angling movement of the bolt relative to the mounting is transmitted to the nut and therethrough to the threaded portion of the bolt as a repetitive bending moment which tends ultimately to cause failure through the thread. In the end connection of the present invention possible repetitive fatigue and ultimate failure through the threads are avoided by transmitting any lateral forces from relative angling movement to the bolt through a connector or retainer having a press fit with an unthreaded part of the stem of the bolt, thus reinforcing the stem and freeing or relieving the threaded portion of such lateral forces.

Applied to connect the illustrated snubber to relatively movable members of a railway truck, the connector or retainer 32 of the connection comprises a sleeve or tube 33 interposed between each end cap and the associated bolt 11 or 19, the connector being driven or turned by a hex or like actuating head or nut 34 fixed to the sleeve 33. Each of the connectors 32 is designed initially to threadedly engage the threaded end portion 28 of its bolt and, guided or centered and driven by this engagement, then to have a press fit with the unthreaded part 35 of the stem of the bolt adjacent and inwardly of its threaded portion. Both the threaded engagement and the press fit are obtained through the sleeve 33, the latter having a threaded outer bore 36 merging with a smooth or unthreaded inner bore 37 of larger free diameter, the bores mating, respectively, with the threaded end portion 28 and the unthreaded part 35 of the bolt.

For limiting the inward movement of the connector 32 and thus predetermining the compression of the rubber block 29, shoulders 38 and 39 are formed in the bolt and sleeve, respectively, intermediate their threaded and unthreaded portions. To reduce rubber friction with the rubber block as the connector is driven home it is preferred that the end cap 30 and sleeve 33 be separate and have a running fit so that the sleeve can be turned while the end cap is held against rotation by the rubber block. The axial interlock between the end cap and sleeve, which this running fit necessitates is obtained by locking the end cap axially between the actuating nut 34 and an outturned or radially projecting annular flange or lip 40 forming the inner end of the sleeve, the flange seating or fitting in a pocket or socket 41 in the end cap and having an underface 42 corresponding in curvature with the cap's underface 31. The nut 34 is brazed or otherwise fixed to the sleeve 33 after assembly of the sleeve and end cap, the sleeve and nut then being slotted on their outer faces to provide a plurality of radially arranged slots 43 for selectively receiving a cotter pin or the like 44 by which the connector 32 is locked in place.

With the threaded end portion 28 of each bolt sufficiently long for threading of the connector while the rubber block 29 is still free and uncompressed, the threaded connection guides the smooth lower bore 37 of the sleeve 33 into engagement with the adjoining unthreaded part 35 of the bolt and holds these portions in alignment until the shoulder 39 marking or delimiting the upper end of the bore 37 is driven home against the corresponding limiting shoulder 38 on the bolt.

An important feature of the invention is the construction of the mountings 23 and 24 by which the snubber 1 is mounted on the spring plank 3 and bolster 2. In addition to the initial assembly, the snubber must be removed periodically whenever the truck is taken apart for change in spring grouping or other purpose. The initial press fit between the retainer 16 and the bolt 11 is normally sufficient to maintain the spring 15 in place, although some care should be used to prevent the snubber from coming apart when its lower end is disconnected, particularly after the snubber has been in service for some while. More important, unthreading of the retainer assembly at both ends of the snubber, each time the latter is removed, will cause wear of the press fit surfaces of the sleeve 33 and bolt 11 or 19, tending to change the initial press fit into a running fit and return the bending moment in the threaded end portion 28 of the bolt, thus circumventing the purpose of the retainer 32.

To avoid the above contingencies and enable the snubber to be assembled and removed as a package with its retainers still locked in place by the cotter pins 44, the snubber is connected to each of the mountings 23 and 24 by a demountable or detachable mounting plate 45. Each of the plates 45 has a pair of end portions 46 spaced by a central portion 47, the latter carrying the positioning lugs 26 and receiving the end of the bolt 11 or 19 through its aperture 27. The central portion 47 of each of the plates 45 is disposed normal to the axis of the snubber. The end portions 46 of each plate are rigidly connectable or attachable, as by riveting or bolting, to a pair of spaced outturned flanges 48 formed integrally with the spring plank 3 for the lower plate and with a pair of legs 49 welded to the bolster 2 for the upper plate. While the mounting plates 45 may be flat, with the flanges 48 on the spring plank and bolster correspondingly inclined, it is preferred that the end portions 46 of the plates be bent or inclined or at an angle relative to their central portions 47, with the inclination such that the flanges 48 may be horizontally disposed, while maintaining the desired normality of the central portions with respect to the snubber. The legs 49 of the mounting or bracket 24 on the bolster 2 are, of course, spaced and the spring plank 3, between the flanges 48, is recessed sufficiently to accommodate the included portions of the snubber and their range of movement. Using such plates, not only can the snubber be applied or removed as a unit, simply by making or breaking the connection between their end portions 46 and the flanges 48 on the spring plate 3 and bolster 2, but identical plates can be employed at top and bottom, thus making them interchangeable and simplifying their manufacture.

From the above detailed description it will be apparent that there has been provided an improved end connection by which the threaded portion of the connecting bolt is relieved of bending moment without impairment of its lateral movement relative to its mounting, the connection being particularly applicable to a snubber for a railway truck which, through detachable mounting plates, is mountable and removable as a unit, without disturbing its threaded end connections. It should be understood that the described and disclosed embodiment is merely exemplary of the invention and that all modifications are intended to be included which do not depart from either the spirit of the invention or the scope of the appended claims.

Having described my invention, I claim:

1. An end connection for connecting a snubber to one of a pair of relatively movable members of a railway truck comprising a mounting on said one member, a mounting plate detachably connected to said mounting, a bolt having a threaded end portion projecting from said snubber and extending through said mounting plate, and a connector threadedly connected to said bolt outwardly of said mounting plate, said connector in connecting position having a press fit with said bolt inwardly of said threaded end portion and being drivable thereinto through said threaded connection.

2. A connector for connecting a snubber to one of a pair of relatively movable members of a railway truck comprising a flanged mounting on said one member, a mounting plate rigid with and removably attached to said mounting, a bolt projecting from said snubber and having a threaded end portion extending through an aperture in said mounting plate, and a connector having a bore divided axially into an outer threaded portion and an inner smooth portion, said threaded portion of said bore being threadedly connectible to said threaded end portion of said bolt and said smooth portion on seating of said connector having a press fit with an unthreaded portion of said bolt inwardly of said threaded end portion.

3. An end connection for threadedly connecting a pair of members having relative angling movement comprising a mounting on one of said members, a mounting plate rigid with and removably attached to said mounting, said other member having a threaded end portion extending through an aperture in said plate, and connecting means threadedly engageable with said threaded end portion and drivable through said threaded engagement into a press fit with said other member inwardly of said threaded end portion.

4. In an end connection for connecting a pair of members having relative angling movement, a threaded end portion on one of said members and projecting through means rigid with said other member, and connecting means threadedly engageable with said threaded end portion and drivable therethrough into a press fit with said one member inwardly of said threaded end portion.

5. In an end connection for connecting a pair of members having relative angling movement, a threaded end portion on one of said members and projecting through means rigid with said other member, a sleeve threadedly engageable with said end portion and drivable therethrough into a press fit with said one member inwardly of said threaded end portion, a collar encircling said sleeve and reacting against said rigid means, and means on said sleeve for interlocking said collar therewith against relative axial movement.

6. In an end connection for connecting a pair of members having relative angling movement, a threaded end portion on one of said members and projecting through means rigid with said other member, a sleeve threadedly engageable with said end portion and drivable therethrough into a press fit with said one member inwardly of said threaded end portion, a collar rotatably encircling said sleeve and reacting against said rigid means, and means on said sleeve for interlocking said collar therewith against relative axial movement.

7. In an end connection for connecting a pair of members having relative angling movement, a threaded end portion on one of said members and projecting through means rigid with said other member, a sleeve threadedly engageable with said end portion and drivable therethrough into a press fit with said one member inwardly of said threaded end portion, a collar rotatably encircling said sleeve and reacting against said rigid means, an actuating head fixed to said sleeve outwardly of said collar, and flange means on said sleeve and coacting with head for interlocking said collar and sleeve against relative axial movement.

8. In an end connection for resiliently connecting a pair of members for relative angling movement, a threaded end portion on one of said members and projecting through said other member, a resilient ring encircling said one member and engaging said other member, a sleeve threadedly engageable with said threaded end portion and drivable therethrough into a press fit with said one member inwardly of said end portion, a collar rotatably encircling said sleeve and engaging said ring, and means on said sleeve for interlocking said collar therewith against relative axial movement, said collar on driving of said sleeve compressing said ring against said other member.

9. In an end connection for connecting a snubber to a pair of relatively movable members of a railway truck, the combination of a mounting rigid with each of said members, spaced flanges on each of said mountings, and a mounting plate having end portions seatable on and detachably secured to the flanges of each of said mountings, said plates being apertured intermediate said end portions for receiving bolts projecting axially from said snubber.

10. In an end connection for connecting a snubber at an incline to a pair of relatively movable members of a railway truck, a mounting rigid with each of said members, spaced horizontally disposed flanges on each of said mountings, and a mounting plate having end portions seatable on and detachably secured to the flanges of each of said mountings, said plates having central portions disposed normal to and receiving bolts projecting axially from said snubber, and said plates being identical and interchangeable.

11. In an end connection for connecting a snubber to a pair of relatively movable members of a railway truck, comprising a mounting rigid with each of said members, spaced substantially planar flanges on each of said mountings, a pair of identical end plates each having end portions seatable on and detachably secured to the flanges of one of said mountings, said end plates each having an aperture intermediate its end portions, a bolt projecting from each end of said snubber and having a threaded end portion extending through said aperture in one of said end plates, a rubber ring encircling each of said bolts outwardly of and bearing against the associated end plate, a sleeve threadedly engageable with each of said threaded end portions and drivable therethrough into a press fit with the associated bolt inwardly of its threaded end portion, a collar rotatably encircling said sleeve and engaging said rubber ring, an actuating head fixed to said sleeve outwardly of said collar, and an annular flange on said sleeve and coacting with said head for interlocking said collar and sleeve against relative axial movement, said collars in press fit position of said sleeves compressing said rubber rings against the associated mounting plates.

References Cited in the file of this patent
UNITED STATES PATENTS

| | | |
|---|---|---|
| 1,625,234 | Wittgenstein | Apr. 16, 1927 |
| 1,813,193 | Nixon | July 7, 1931 |
| 2,516,081 | Spencer | July 18, 1950 |
| 2,516,082 | Spencer | July 18, 1950 |
| 2,574,788 | Janeway | Nov. 13, 1951 |
| 2,625,117 | Van Der Sluys | Jan. 13, 1953 |